United States Patent
Kirchhoff

(10) Patent No.: US 7,101,184 B2
(45) Date of Patent: Sep. 5, 2006

(54) DRAW-TRACE-ERASE ART TRAINING DEVICE

(76) Inventor: Robert W. Kirchhoff, 1N615 Ingalton, West Chicago, IL (US) 60185

( * ) Notice: Subject to any disclaimer, the term of this patent is extended or adjusted under 35 U.S.C. 154(b) by 30 days.

(21) Appl. No.: 11/036,795

(22) Filed: Jan. 18, 2005

(65) Prior Publication Data

US 2006/0158621 A1    Jul. 20, 2006

(51) Int. Cl.
*G09B 11/04* (2006.01)
(52) U.S. Cl. .......................................... 434/88; 434/85
(58) Field of Classification Search ................. 434/81, 434/85, 87, 88, 308, 311; 446/149, 151
See application file for complete search history.

(56) References Cited

U.S. PATENT DOCUMENTS

| | | | | |
|---|---|---|---|---|
| 1,505,967 A | * | 8/1924 | Myers | 40/518 |
| 3,889,397 A | * | 6/1975 | Flood | 434/88 |
| 4,340,372 A | * | 7/1982 | Brassine | 434/88 |
| 4,427,387 A | * | 1/1984 | Tomita | 434/88 |
| 4,600,393 A | * | 7/1986 | Rosenwinkel et al. | 434/88 |
| 5,110,295 A | * | 5/1992 | Concra | 434/88 |
| 5,213,504 A | * | 5/1993 | Lee et al. | 434/84 |
| 5,515,631 A | * | 5/1996 | Nardy et al. | 40/518 |
| 5,611,694 A | * | 3/1997 | Bromley | 434/311 |
| 5,785,528 A | * | 7/1998 | Jones-Fenleigh et al. | 434/88 |
| 5,944,574 A | * | 8/1999 | Small et al. | 446/149 |
| 6,055,753 A | * | 5/2000 | Sondericker, III | 40/471 |
| 6,241,528 B1 | * | 6/2001 | Myers | 434/408 |
| 6,308,910 B1 | * | 10/2001 | Booth | 242/598.3 |
| 6,377,780 B1 | * | 4/2002 | Greenberg | 434/311 |
| 6,422,503 B1 | * | 7/2002 | Hoo Kong | 242/559.4 |
| 6,450,819 B1 | * | 9/2002 | Kaufman et al. | 434/178 |
| 6,893,266 B1 | * | 5/2005 | Donelan | 434/408 |

\* cited by examiner

*Primary Examiner*—Kurt Fernstrom

(57) ABSTRACT

An art training device. A graphics scroll presents various images suitable for tracing or copying, or blank spaces for freehand drawing, as it is wound or unwound on spindles. A transparent drawing sheet is mounted just above the scroll for the user to practice on.

14 Claims, 1 Drawing Sheet

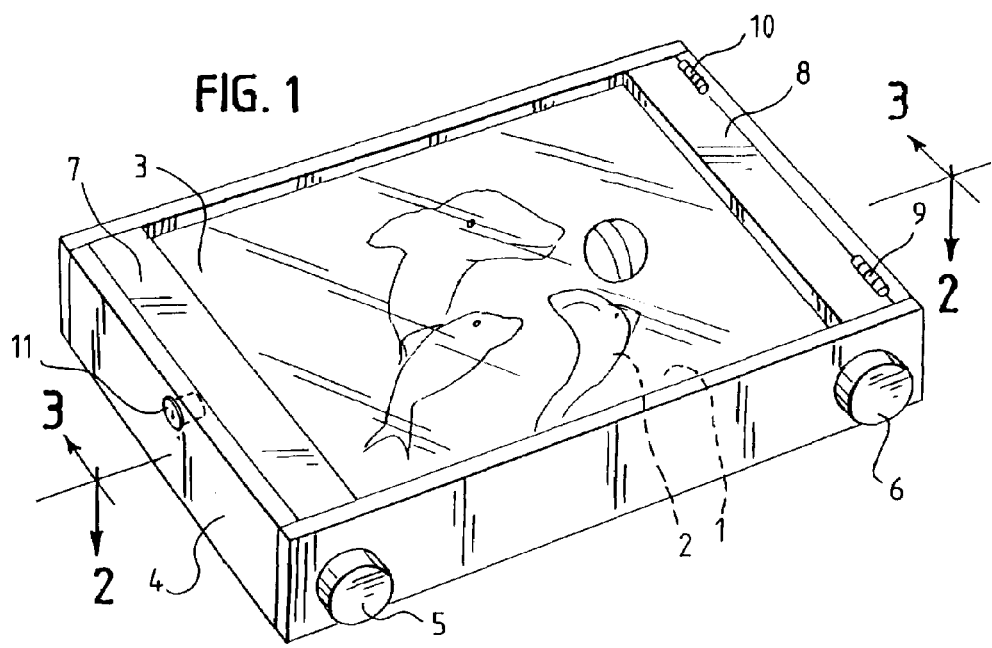
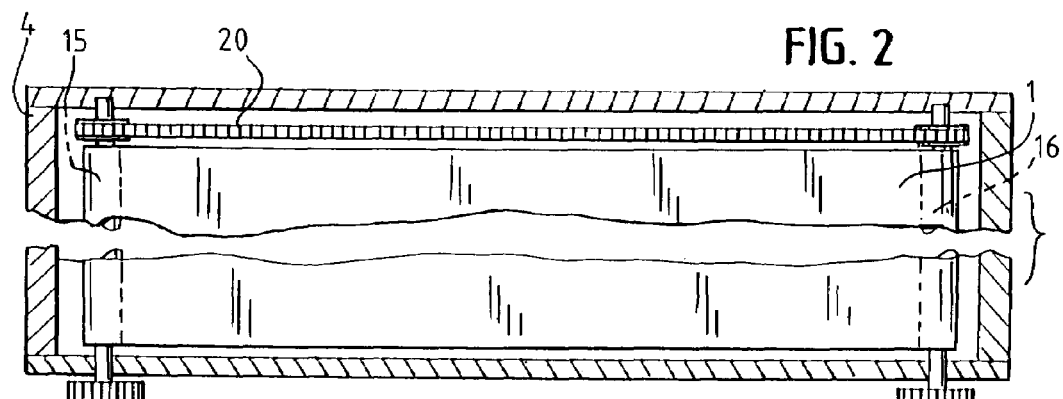
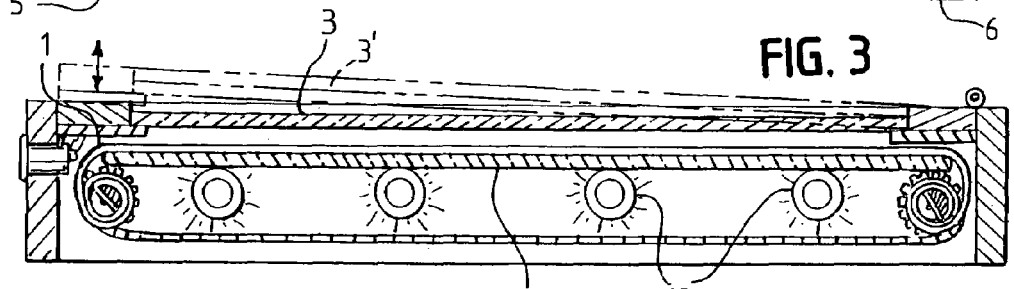
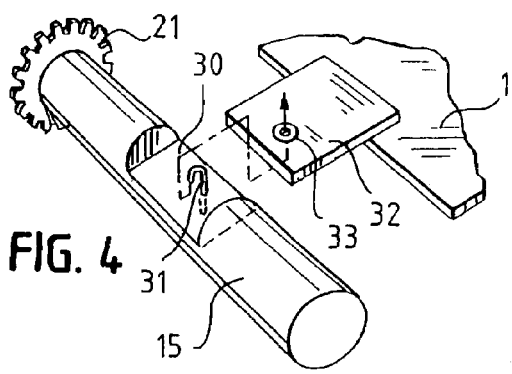
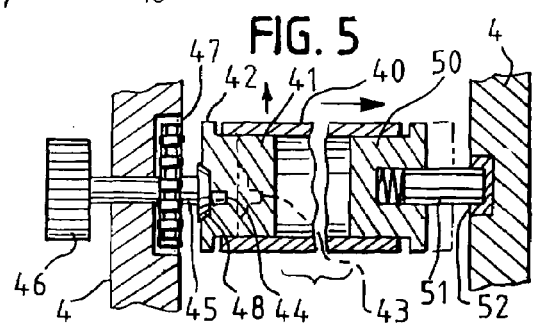

DRAW-TRACE-ERASE ART TRAINING DEVICE

BACKGROUND OF THE INVENTION

There are numerous techniques for teaching art and drawing. A couple of features that might be desirable in a training device for children or aspiring artists or draftsmen might be: 1. a large inventory of sample drawings or pictures readily available to copy or trace, and 2. a practice surface that is easily erasable and can be used for either tracing and copying of practice samples or freehand drawing. The present invention provides these features.

SUMMARY OF THE INVENTION

An transparent or translucent drawing sheet, preferably erasable, is mounted just over a scroll upon which are reproduced practice figures or graphics of various sorts for practice in tracing or copying on the erasable drawing sheet above the scroll. Blank areas on the scroll provide opportunity for freehand drawing on the drawing sheet above the scroll.

BRIEF DESCRIPTION OF THE DRAWINGS

FIG. 1 shows the art training device in perspective showing the top and front.

FIG. 2 is a sectional view of the invention taken along line 2—2 of FIG. 1 showing the inner workings.

FIG. 3 is a sectional view of the invention taken along line 3—3 of FIG. 1.

FIG. 4 shows a method of attaching a removable graphics scroll to a spindle.

FIG. 5 is a sectional view of another type of spindle.

DETAILED DESCRIPTION OF THE INVENTION

Referring to FIG. 1, graphics scroll 1 has printed upon it various graphics such as picture 2 suitable for training persons in art by tracing or copying such pictures on a transparent or translucent sheet 3 mounted on frame 4 just above the scroll. FIG. 3 shows this also, where 3 represents a transparent or translucent drawing sheet mounted above scroll 1 and 3' the moved position if the top of the device is opened. Areas of the scroll may also be left blank for practicing freehand drawing or copying.

When the present invention is used with small children, it is advisable to keep their fingers out of the innards for safety and security by having the frame 4 completely enclosing the working parts, and all panels, including drawing sheet 3 and panels 7 and 8, fixed or locked in a childproof manner. In FIG. 1 this is achieved by affixing the unified top of the device, including panels 7 and 8 and drawing sheet 3, to the frame at one end with hinges 9 and 10 and at the other end with lock 11 or some sort of childproof locking mechanism. An alternative construction could have panels 7 and 8 used for scroll access, lockable for use with small children. It should be understood that there are numerous locations where access panels could be located in the present invention, but that regardless of the location it is a desirable safety feature that any access panels be lockable. An additional safety feature would be knobs having sufficient bulk to be nonswallowable.

Knobs 5 and 6 wind the scroll one way or the other to expose additional graphics or blank spaces. In FIG. 2 it can be seen how knobs 5 and 6 turn scroll spindles 15 and 16 to wind and unwind the scroll. The spindles are mounted in frame 4 so that the section of scroll stretched between the spindles exposes a graphic for copying or tracing, or a blank area, or both. For smooth bidirectional scrolling with either knob and to prevent "bunching up" of the scroll, it is desirable that either knob turn both spindles simultaneously. In FIG. 2 this is accomplished by connecting the spindles by a chain 20 that is driven by sprockets, such as 21 of FIG. 4 or 47 of FIG. 5, that are mounted to the spindle ends and turn with them. Other means such as pulleys and a belt or a gear train could be used. This system works well with scrolls that are not overly long. If extremely long scrolls are used such that there is sometimes a considerable difference in diameter between the part of the scroll rolled on one spindle compared to the diameter of the scroll portion on the other spindle, then the scroll spindles must revolve at different speeds to prevent undue slackening or tightening of the paper web, and the chain 20 can be eliminated between spindles.

Referring to FIG. 3, graphics scroll 1 is sandwiched between drawing sheet 3 and support plate 17. Sheet 3 can be any sort of transparent or translucent drawing substrate through which the graphics on the scroll can be seen—glass, plastic, tracing paper. For economy it is desirable that an easily erasable combination of drawing sheet and artist media be employed, such as dry erase markers on plastic or glass. Polypropylene has been found to work well with dry erase markers. Optionally for use with a semi-transparent drawing material such as tracing paper, lights such as 18 could be used in conjunction with a transparent support sheet 17 for more clearly delineating the graphic to be traced.

To offer a greater variety of graphics figures for practice, scroll 1 could be removable from its spindles so that it could be exchanged with other scrolls. FIG. 4 shows a preferred method of attaching a removable graphics scroll 1 to the spindles. Spindle 15 has a cutout portion 30 in which is affixed hook 31. Attached to scroll 1 is a tab 32 a portion 33 of which defines a hole that engages the hook 31.

FIG. 5 shows alternative possible constructions of the spindle and drive mechanism. 40 is a cardboard tube to which a graphics scroll is attached. There are tight-fitting plugs 41 and 50 at either end of the tube. The stopper rim portion 42 of plug 41 abuts against the end of the cardboard tube when the plug is inserted. The cardboard tube and two plugs make up a removable spindle. The spindles of FIGS. 4 and 5 can be used in any combination—two of either type or one of each.

Plug 41 is connected to knob shaft 45 by a disengageable male-female coupling made up of a female coupling portion 43 of Plug 41 that is engaged by the male part of the coupling 44 located at the end of the knob shaft 45, which is turned by knob 46, as is also sprocket 47 that is used to turn the other spindle by means of a chain. Various types of coupling can be used—square drive, star drive, splined shaft, for example. In this embodiment, sprocket 47 is recessed into the frame 4, or even totally enclosed. This is advantageous to keep children's fingers or debris out of the chain drive. Optionally, knob shaft 45 might have a centering flange 48, that is tapered or convex in the direction of a mating portion of plug 41, for accurate centering of the cardboard tube for smooth scrolling.

On the other side of the tube, plug 50 has an axial spring-loaded shaft 51 that engages and turns in a bearing 52 insert or portion of frame 4. There is enough play between plug 50 and frame 4 so that if tube 40 is moved to the right, the male-female coupling at the left end of the tube is decoupled and the tube can be removed and replaced with a new tube with a different scroll. Needless to say, spring-loaded shaft 51 can be reversed; that is, the cup bearing made part of the plug and shaft 51 part of the frame.

I claim:

1. An art training device comprising:

A frame;

A graphics scroll that winds and unwinds on two spindles mounted apart on said frame in such manner that various images or blank areas are presented to the user on the scroll area between the spindles as the scroll is wound and unwound;

Means for turning the scroll spindles simultaneously at the same rate; and

A transparent or translucent sheet mounted above the graphics scroll upon which a user can practice tracing or copying figures on the scroll or freehand drawing.

2. The art training device of claim 1, wherein said simultaneous turning means comprises a chain driven by sprockets connected to the scroll spindles.

3. The art training device of claim 2 for use with small children, wherein the chain and sprocket are recessed in the frame or totally enclosed to prevent children's fingers or debris from contacting the chain drive.

4. The art training device of claim 1, further comprising a scroll which is removably attached to at least one of the spindles to facilitate substitution of different graphics scrolls.

5. The art training device of claim 4, wherein the spindle to which a scroll is removably attached has a cut out section in which is affixed a hook, and the scroll has attached to its end a tab, a portion of which defines a hole that engages the hook.

6. The art training device of claim 1, further comprising at least one spindle that is removable to facilitate substitution of a variety of graphics scrolls.

7. The art training device of claim 6, wherein the removable spindle is driven through a male-female coupling at one end and at the other end is rotatable on an axial spring-loaded shaft by which it connects to the frame, there being sufficient play of the spindle between itself and the frame to enable decoupling of the male-female coupling as the spindle is moved toward the frame.

8. The art training device of claim 7, wherein the removable spindle comprises a cardboard tube and a pair of tight-fighting insertable plugs that go in the ends of the tube, one of the plugs being driven through the male-female coupling, and the other plug being rotatable on the axial spring-loaded shaft, there being sufficient play of the plug between itself and the frame to enable decoupling of the male-female coupling as the spindle is moved toward the frame.

9. The art training device of claim 1, wherein the transparent drawing sheet is made of polypropylene, for use with dry erase markers.

10. The art training device of claim 1, further comprising at least one access panel for replacement of scrolls, any such access panel being lockable for safety to prevent small children from getting inside the device.

11. The art training device of claim 1, wherein the means for turning the scroll spindles comprises knobs connected to the spindle ends that are turned by the user.

12. The art training device of claim 11 for use with small children, wherein for safety the knobs are too large to swallow.

13. The art training device of claim 1, further comprising a support plate mounted below the scroll to support the area between the spindles.

14. The art training device of claim 13, wherein the support plate is transparent and a light source is situated beneath the support plate to illuminate graphics figures from beneath.

\* \* \* \* \*